July 17, 1923.
T. E. PETTY
BOTTLE RECEPTACLE
Filed June 7, 1919
1,462,356
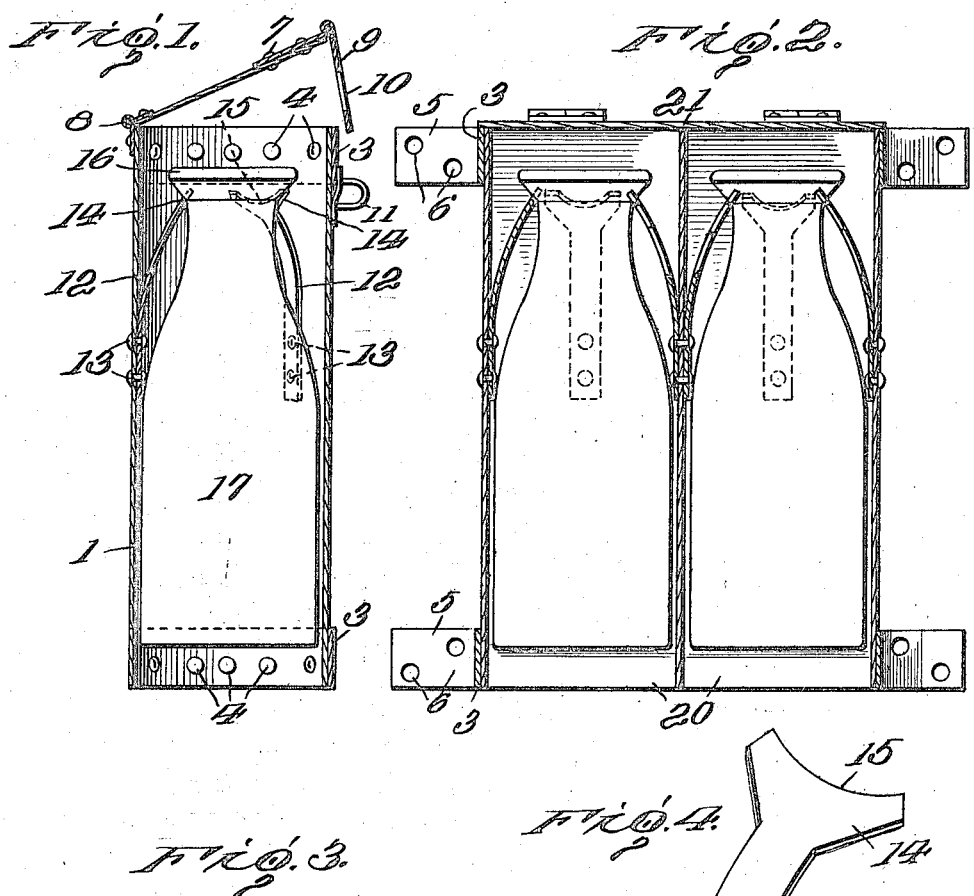
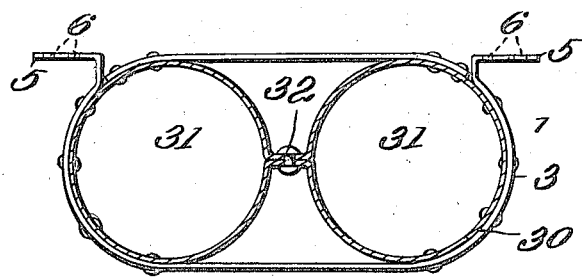
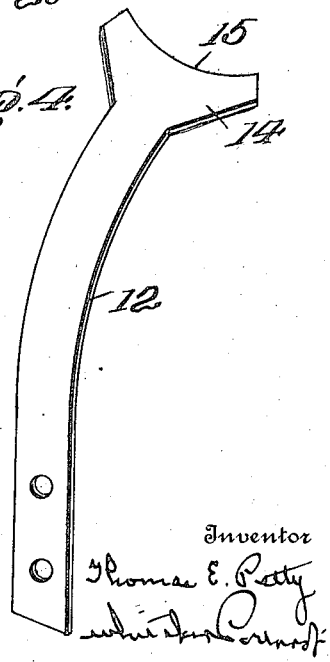

Patented July 17, 1923.

1,462,356

UNITED STATES PATENT OFFICE.

THOMAS E. PETTY, OF WASHINGTON, DISTRICT OF COLUMBIA.

BOTTLE RECEPTACLE.

Application filed June 7, 1919. Serial No. 302,387.

*To all whom it may concern:*

Be it known that I, THOMAS E. PETTY, citizen of the United States, residing at Washington, in the District of Columbia, have invented certain new and useful Improvements in Bottle Receptacles; and I do hereby declare the following to be a full, clear, and exact description of the invention, such as will enable others skilled in the art to which it appertains to make and use the same.

My invention relates to improvements in receptacles for use in storing bottles of milk during the period between the time that they are deposited by the dairyman and the time that they are removed by the person to whom the milk was delivered.

The principal object of the invention is to provide a receptacle of this character which will readily permit the insertion of a bottle or bottles; will securely lock the bottles against removal by an unauthorized person; will allow quick and easy removal by an authorized person; and will house the bottles in a sanitary manner.

A further object is to furnish a receptacle of simple construction which may be made at an expense small enough to justify universal use.

My receptacle is adapted to be placed on a door jam or any convenient place and the milk dealer inserts the milk bottle through the open bottom and forces the same upwardly until the neck is grasped by strong spring arms, which prevent the bottle from being withdrawn through the bottom of the receptacle. These spring arms are located near the upper end of the receptacle so that the bottle must be placed entirely within the receptacle before it is locked, and when in this position, the clearance between the bottle and interior surface of the receptacle is insufficient to permit the insertion of the fingers for the purpose of seizing the bottle.

It is obvious that the receptacle may be of such dimensions, as will accommodate a bottle of any size. The receptacle includes an attached cover which is preferably hinged to the body of the receptacle and this cover is adapted to be secured in closed position by means of a suitable lock.

The locking arms of my receptacle are secured to the body of the receptacle and they are located in such position that the bottle will have to be entirely inserted within the receptacle before it is grasped and the top of the bottle, after the bottle is inserted, will be arranged in close proximity to the top of the receptacle, so that the bottle may be readily grasped and withdrawn by the person having the key to the cover lock.

My invention consists in the novel features hereinafter described in detail, illustrated in the accompanying drawing and more particularly pointed out in the appended claims.

Referring to the drawing:—

Fig. 1 is a vertical sectional view of a receptacle designed to hold a single bottle of milk.

Fig. 2 is a vertical sectional view of a duplex receptacle.

Fig. 3 is a horizontal sectional view of a modified form of duplex receptacle.

Fig. 4 is a perspective view of one of my specially designed resilient gripping arms.

In the embodiment of my invention, illustrated in Fig. 1, 1 designates the open ended body of my receptacle, which is preferably of cylindrical form and is of a diameter closely approximating the diameter of a quart milk bottle. The receptacle may be made of any suitable rigid material, such as tin, papier mache, and the like. Bands 3 are passed part way around the body and secured to the same by rivets 4. These bands, as shown in Figs. 2 and 3, are provided with wings 5 having apertures 6 through which nails or screws are passed in securing the body to a door jam or other support. A cover 7 is hinged to the body at 8 and it is provided with a pivoted member 9 having an aperture 10 adapted to receive a staple 11 fixed to the body 1. A suitable padlock (not shown) is adapted to engage the staple for locking the cover in closed position.

Located within the body and secured to the upper portion of the wall of the same are a plurality of resilient metal gripping arms 12, shown in detail in Fig. 4. These arms have their lower ends riveted to the body as shown at 13 and they curve upwardly and centrally, as shown. Their upper portions terminate in enlarged heads 14 having curved upper faces or edges 15, the curvature of each of which is substantially the same as the under face of the neck flange 16 of the bottle 17. This enlarging of the heads of the gripping arms, provides a broad supporting surface upon which the neck flange rests and owing to the curvature 15 of the heads any downward pull on the bottle will have a tendency to move the heads into horizontal position and cause them to more tightly grasp the bottle neck. For this reason, it will be seen that if it were possible to secure any grip on the bottle to pull the same downward, the spring arms would more securely grasp the bottle and prevent withdrawal from the bottom.

The heads 14 are arranged in close proximity to the upper end of the body, so that a bottle must be entirely inserted before it is grasped and when the cover is raised, the bottle top will be sufficiently close to the upper end to permit the purchaser to grasp the bottle neck and draw the bottle up and out of the receptacle. This is an important feature of my invention, for if the spring arms were so located as to leave the bottle protruding from the bottom, then the bottle would be grasped with a sufficient grip to pull the same away from the spring arms. Also if the spring arms were carried by a removable cover, then the operator would have to hold the springs in depressed position while the bottle was being removed and besides there would be a liability of misplacing or losing the cover.

The construction shown in Fig. 2 is the same as that described in connection with Fig. 1, except that the former has two compartments 20 closed by a single cover 21.

In the embodiment shown in Fig. 3, a two-pocket receptacle 30 is shown having pockets 31 formed by pressing two opposite sides of a tube together and connecting said sides by a rivet 32. This merely illustrates a convenient and inexpensive method by which a plural pocket receptacle may be formed.

The operation is as follows: The dairyman, who usually arrives with the milk at a very early hour, inserts a bottle through the open bottom of the receptacle and moves the same upwardly until the neck flange 16 engages the heads of the spring arms. As the bottle rises it will force the arms apart until the flange 16 has moved above the heads 14, and then the heads will automatically move centrally and the curved edges 15 will engage the under surface of the flange and prevent the bottle from being withdrawn from the bottom. When the purchaser wishes to withdraw the bottle, he unlocks the padlock which secures the member 9, raises the cover 7 and then places his fingers beneath the flange 16 and draws the bottle upwardly and out of the receptacle, the resiliency of the spring arms permitting this.

I am aware that various changes and modifications may be made in my construction without departing from the spirit of the invention as set forth in the following claim.

What I claim and desire to secure by Letters Patent is:—

A receptacle comprising a cylindrical tubular body having its ends open, a cover closing the upper end of said body, and a plurality of longitudinally extending resilient sheet metal gripping arms forming the only internal obstruction in said body secured to the body and unconnected to the cover, the upper ends being free and gripping heads located in close proximity to the upper end of the body and being adapted to encircle and grasp the neck of a bottle inserted through the open bottom of said body, said heads being urged inwardly toward the longitudinal axis of said body by the resiliency of the gripping arms and being adapted to automatically release the bottle neck and permit its withdrawal through the top of the body, said body being of substantially the same diameter as the bottle to be gripped in order to prevent any releasing instrument from being inserted between the body and the bottle.

In testimony whereof I affix my signature.

THOMAS E. PETTY.